US010817036B2

(12) United States Patent
Wanner et al.

(10) Patent No.: US 10,817,036 B2
(45) Date of Patent: Oct. 27, 2020

(54) COMPUTER SYSTEM HAVING REDUNDANT POWER SUPPLY AND SYSTEM BOARD

(71) Applicant: FUJITSU LIMITED, Kawasaki-shi, Kanagawa (JP)

(72) Inventors: Manfred Wanner, Munich (DE); Alfons Suiter, Munich (DE)

(73) Assignee: FUJITSU LIMITED, Kawasaki (JP)

( * ) Notice: Subject to any disclaimer, the term of this patent is extended or adjusted under 35 U.S.C. 154(b) by 179 days.

(21) Appl. No.: 15/823,763

(22) Filed: Nov. 28, 2017

(65) Prior Publication Data
US 2018/0181176 A1    Jun. 28, 2018

(30) Foreign Application Priority Data

Dec. 27, 2016  (DE) .................. 10 2016 125 707

(51) Int. Cl.
*G06F 1/00* (2006.01)
*G06F 1/26* (2006.01)
*G06F 1/18* (2006.01)
*G06F 1/30* (2006.01)
*G06F 11/20* (2006.01)

(52) U.S. Cl.
CPC .............. *G06F 1/263* (2013.01); *G06F 1/185* (2013.01); *G06F 1/188* (2013.01); *G06F 1/30* (2013.01); *G06F 11/2015* (2013.01)

(58) Field of Classification Search
CPC . G06F 1/263; G06F 1/185; G06F 1/30; G06F 11/2015; G06F 1/188
See application file for complete search history.

(56) References Cited

U.S. PATENT DOCUMENTS

| 6,275,946 B1 | 8/2001 | Meir |
| 10,198,055 B2* | 2/2019 | Phan ................. G06F 1/189 |
| 2005/0174137 A1* | 8/2005 | DeVey ............ G01R 31/31924 324/756.06 |
| 2006/0146504 A1 | 7/2006 | Belson et al. |

(Continued)

FOREIGN PATENT DOCUMENTS

WO    2016/048281 A1    3/2016

OTHER PUBLICATIONS

GBSR—Search Report of Great Britain Patent Application No. GB1720512.1 dated May 30, 2018.

*Primary Examiner* — Xuxing Chen
(74) *Attorney, Agent, or Firm* — Fujitsu Patent Center

(57) ABSTRACT

The invention relates to a computer system, comprising a chassis, a system board, which is arranged in the chassis, and a first power supply unit, which is directly connected to the system board via at least one first plug connector. Furthermore, the computer system comprises an expansion board, which is arranged in the chassis and connected to the system board via at least one second plug connector. Furthermore, the computer system comprises a second power supply unit, which is directly connected to the expansion board via at least one third plug connector, and a circuit, which is arranged on the system board, wherein the circuit is connected to the at least one first plug connector and the at least one second plug connector and is configured to enable a power supply of the computer system selectively by the first power supply unit and/or the second power supply unit.

13 Claims, 2 Drawing Sheets

(56) References Cited

U.S. PATENT DOCUMENTS

Figure 1:
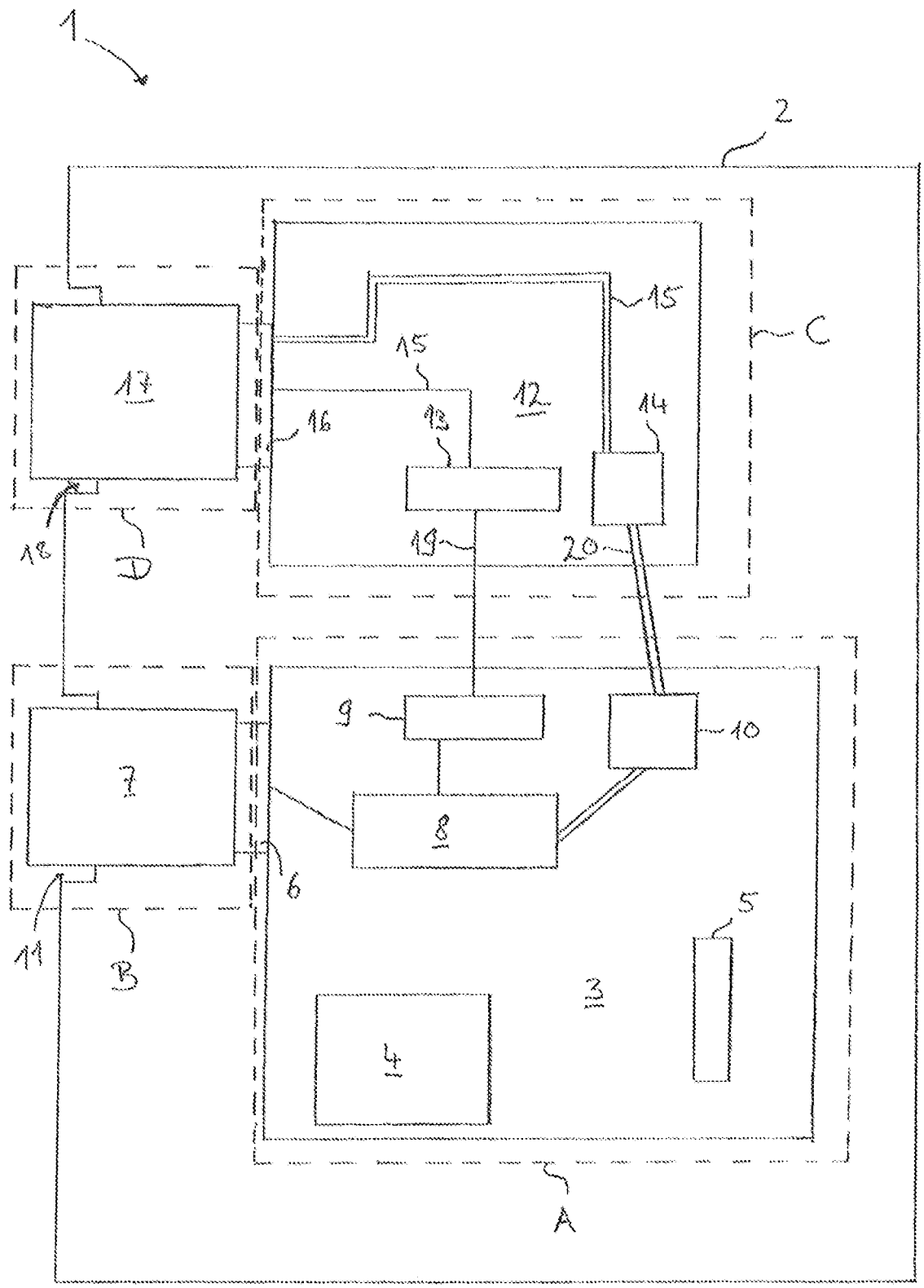

| | | | |
|---|---|---|---|
| 2010/0017628 A1* | 1/2010 | Chen | G06F 1/188 |
| | | | 713/300 |
| 2012/0270417 A1 | 10/2012 | Lorentzen | |
| 2013/0326237 A1* | 12/2013 | Holdengreber | G06F 1/26 |
| | | | 713/300 |
| 2013/0326240 A1 | 12/2013 | Huang | |
| 2014/0313661 A1 | 10/2014 | Lin | |
| 2016/0134137 A1* | 5/2016 | Hirosawa | G06F 1/266 |
| | | | 320/160 |

* cited by examiner

COMPUTER SYSTEM HAVING REDUNDANT POWER SUPPLY AND SYSTEM BOARD

The present invention relates to a computer system with redundant power supply, including a chassis, a system board which is arranged in the chassis, a first power supply unit and a second power supply unit. The invention also relates to a system board for a computer system.

Redundant power supplies become more and more important for example in server systems, since important data and applications are provided on them, the failure of which is critical even but for a short period of time. When buying a computer system, a user often does not know whether he or she needs a redundant power supply at a later time, or not.

Generally, the user has two options in this situation: either he buys a system with redundant power supply, or he chooses a computer system that does not enable a redundant power supply and, should a redundant power supply be required at a later time, he must purchase expensive additional components making the system a system with redundant power supply. The first case comes with the disadvantage that the user may possibly spend a lot of money for a redundant system he will not use after all. In the second case, the user must spend a lot of money for expensive additional components afterwards.

The object of the present invention, is to describe an architecture for a computer system which solves or reduces the above problems.

According to a first aspect of the invention, the above-mentioned object is achieved by a computer system, including a chassis, a system board arranged in the chassis, a first power supply unit and a second power supply unit. The first power supply unit is connected to the system board via at least one first plug connector. The computer system further comprises an expansion board, which is arranged in the chassis and connected to the system board via at least one second plug connector. The second power supply unit is directly connected to the expansion board via at least one third plug connector. A circuit is arranged on the system board, wherein the circuit is connected to the at least one first plug connector and the at least one second plug connector and is configured to enable a power supply of the computer system either by the first power supply unit and/or by the second power supply unit.

One advantage of the invention is that the system board comprises only the at least one first plug connector for the direct connection of the first power supply unit. The at least one third plug connector for connecting the second power supply unit is mounted on the expansion board and thus connected to the system board only indirectly via the at least one second plug connector. Plug connectors for connecting a power supply unit require considerably more space and are significantly less flexible in terms of arrangement on a circuit board than the at least one second plug connector. Another plug connector for another power supply unit directly on the system board would thus have significant effects on the configuration of the system board. These effects can be minimized by attaching the at least one second plug connection. Another advantage lies with the attachment of the circuit for controlling and monitoring the power supply in a redundant or non-redundant mode on the system board. In this way, the expansion board does not require a complex circuit for controlling and monitoring the power supply. The expansion board can thus be produced and marketed at a favorable price.

In at least one embodiment of the invention, the system board is arranged in a first region in the chassis and the chassis comprises a first plugin option for the first power supply unit in a second region neighboring the first region. The expansion board is arranged in a third region and the chassis further comprises a second plugin option for the second power supply unit in a fourth region neighboring the third region.

This is advantageous in that the system board and the expansion board are separated. The expansion board, which enables a redundant power supply of the computer system, can be removed or retrofitted independently of the system board and thus independently of an operation of the computer system. Another advantage of this embodiment is that the system board and the expansion board can be arranged in the chassis in a space-saving manner. The system board can be designed to have small dimensions, since it only comprises one direct port for the first power supply unit and extends merely in the first region. Thus, the system board is less expensive than a circuit board, which extends in the first and third regions and comprises direct ports for the first and second power supply units.

In at least one embodiment, the expansion board exclusively comprises passive components, in particular plug connectors, signal lines and power lines. One advantage is that the expansion hoard does not comprise expensive, active components and can be produced and purchased at a favorable price.

In another embodiment of the invention, the first power supply unit and the second power supply unit are hot-plug-capable. In this way, the first or the second power supply unit can be exchanged while the computer system operates without affecting the operation. In this way, old or defective power supply units can be renewed at any time without turning-off the computer system.

In at least one advantageous embodiment, the at least one second plug connector comprises a first power plug connector and a first signal plug connector on the system board and a second power plug connector and a second signal plug connector on the expansion board. The computer system is supplied with power by the second power supply unit via the power plug connectors, signals are sent from the second power supply unit to the circuit on the system board via the signal plug connector.

In at least one embodiment of the invention, the first power plug connector and the second power plug connector are connected through a power supply cable and the first signal ping connector and the second signal plug connector are connected through a signal cable. One advantage is that conventional power or signal cables can be used.

In another advantageous embodiment of the invention, the expansion board is directly plugged to the system board via the at least one second plug.

In at least one embodiment of the invention, at least two power supply units are connected to the expansion board. This provides the advantage that even larger computer systems can be supplied with sufficient power.

In at least one further embodiment of the invention, the computer system comprises at least one further expansion board, which is connected to at least one further power supply unit. The advantage is that multiple expansion boards and multiple power supply units ensure higher security of the redundant power supply against a complete failure of the power supply.

According to another aspect, the above object is achieved by a system board having at least one first plug connector for the direct connection of a first power supply unit. The system board further includes a second plug connector for the indirect connection of a second power supply unit via a retrofit expansion board and a circuit, which is connected to the at least one first plug connector and the at least one second plug connector and configured to enable a power supply of the computer system either by the first power supply unit and/or the second power supply unit.

The advantage is that the user does not have to decide whether he needs a redundant power supply or not when purchasing the system board. The port for a retrofit expansion board makes it possible to equip a computer system with a redundant power supply at a later time. Only the first power supply unit is directly connected to the system board. A system having a redundant power supply, in which also the second power supply unit is directly connected to the system board, requires a significantly larger system board, which increases e.g. the production costs of the board significantly.

Further advantageous embodiments are indicated in the appended claims as well as the following description of the figures.

Figure 2:
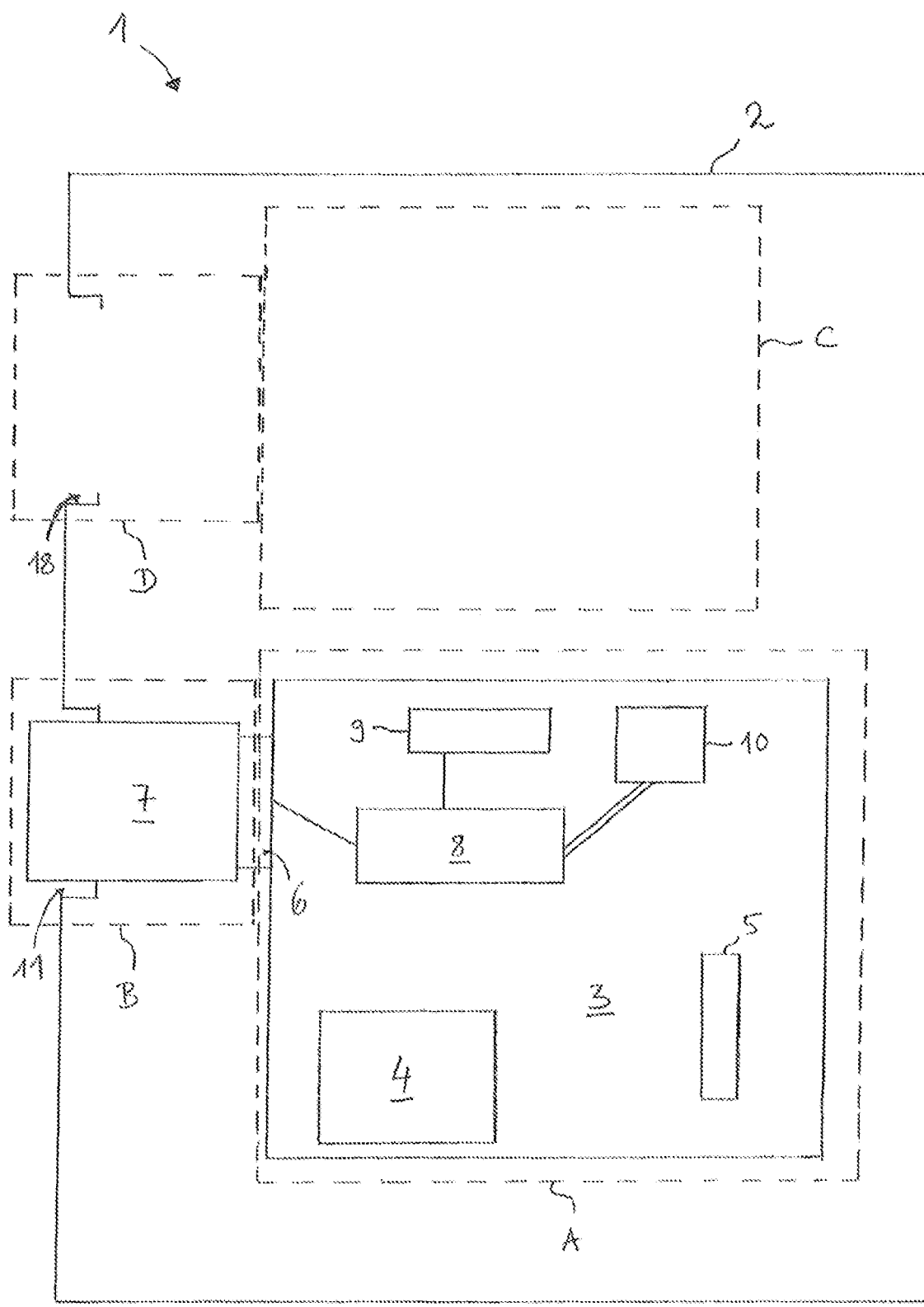

The figures show in:

FIG. 1 a schematic illustration of a computer system according to one embodiment of the invention, FIG. 2 a schematic illustration of an alternative configuration of the computer system of FIG. 1.

FIG. 1 shows a schematic illustration of a computer system 1 according to one embodiment of the invention. The computer system 1 includes a chassis 2, in which a system board 3 is arranged. Such a system board 3 is e.g. a mainboard and the computer system 1 is e.g. a server system. At least one component 4, such as a processor, is mounted on the system board 3. Furthermore, the system board 3 includes at least one port 5, through which further elements of the computer system 1, which are not shown in this exemplary embodiment, can be connected. The system board 3 is directly connected to a first power supply unit 7 via a first plug connector 6. Furthermore, the system board 5 comprises a circuit 8, which is connected to the first plug connector 6, a first power plug connector 9 and a first signal plug connector 10.

The system board 3 is arranged in a first region A in the chassis 2 and the first power supply unit 7 is arranged in a region B of the chassis 2 neighboring the first region A. In the second region B, the chassis 2 comprises a first plugin option 11 for the first power supply unit 7.

An expansion board 12 is mounted in a third region C of the computer system 1. The expansion board 12 comprises a second power plug connector 13 and a second signal plug connector 14. The second power plug connector 13 is connected to the first power plug connector 9 of the system board 3 through a power supply cable 19. In this exemplary embodiment, the power supply cable 19 includes four 12 V lines and four ground lines. The second signal plug connector 14 is connected to the first signal plug connector 10 of the system board 3 through a signal cable 20. In this exemplary embodiment, the signal cable 20 is a data line for a system management bus. The power plug connectors 9 and 13 are 8-pin power jacks and the signal plug connectors 10 and 14 are 14-pin headers. Alternatively, the expansion board 12 can also be connected to the system board 3 through a second plug connector, which combines the power plug connectors 9 and 13 and the signal plug connectors 10 and 14.

A second power supply unit 17 is directly connected to the expansion board 12 through a third plug connector 16. In this exemplary embodiment, the third plug connector 16 as well as the first plug connector 6 are press-fit plug connectors. The second power supply unit 17 is arranged in a fourth region D and inserted in a second plugin option 18 of the chassis 2. The fourth region D adjoins the third region C. In this exemplary embodiment, the first supply unit 7 and the second power supply unit 17 are hot-plug capable.

The computer system 1 is redundantly supplied with power via the first power supply unit 7 and the second power supply unit 17. The at least one component 4 as well as the further elements connected through port 5 are thus supplied with power. If one or the two power supply units 7 or 17 fails, the other power supply unit 17 or 7 provides power for the computer system 1. In a normal operating mode, it is possible to provide the power for the computer system 1 only via the first power supply unit 7 and keep the second power supply unit 17 in a standby mode, so that the second power supply unit 17 is activated if the first power supply unit 7 does not provide sufficient power. As an alternative, both power supply units 7 and 17 can be operated in parallel in such a way that they each cover 50 percent of the power consumption of the computer system 1. However, there is no limitation with regards to the implementation of the redundant power supply.

In this exemplary embodiment, the circuit 8 provides all logics and control technology required by the computer system 1 to enable a redundant operation. This includes e.g. the evaluation of signals received by the circuit 8 through the first signal plug connector 10 from the second power supply unit 17 via the expansion board 12, as well as e.g. the monitoring of the power supply by the first power supply unit 7 or the second power supply unit 17, respectively. The first and second signal plug connectors 10 and 14 are e.g. used to send control signals such as power ON or power OK and/or for a system management bus for controlling the power output. Furthermore, the circuit 8 serves to perform current measurements on current rails of the power supply units 7 and 17 and to turn them off in an overload situation, as required.

In this exemplary embodiment, the expansion board 12 exclusively comprises passive components 15, such as signal lines and power lines. In this exemplary embodiment, signals being sent from the second power supply unit 17 to the system board 3 through the expansion board 12 are only forwarded by the expansion board, so that the expansion board 12 does not require logics for generating or evaluating these signals. The signals are assigned to corresponding signal lines in the third plug connector 16. As a matter of fact, the expansion board 12 may also comprise active components such as diodes or transistors.

The circuit 8 is located on the system board 3. For this reason, a passive board is sufficient as the expansion board 12, the passive board enabling a connection of the second power supply unit 17 in the computer system 1 and forwarding the current from the second power supply unit 17 as well as signals to the system board 3. Such a passive power backplane can be produced and offered to a user in a significantly more cost-efficient manner compared to an elaborate expansion board that comprises all logics and control technology for a redundant operation.

The system board 3 is also significantly less expensive than a system board in a redundantly operated computer system 1 without expansion board 12. In this exemplary embodiment, the system board 3 extends only in the first region A. Thus, it is significantly smaller than a circuit board, which provides direct ports for at least two power supply units. In a redundant system without expansion board 12, the system board 3 would additionally have to extend in the third region C to enable a direct connection to the second power supply unit 17.

FIG. 2 shews a configuration variant of the computer system 1 of FIG. 1. Unless indicated otherwise, the components correspond to the components described above and mentioned with reference to FIG. 1.

FIG. 2 shows e.g. a configuration of the computer system 1, in which the computer system 1 is supplied to a user. At the time of purchase, the user e.g. does not require a redundant power supply. However, there is an option to retrofit the computer system 1 at a later time without large efforts and higher costs in order to enable a redundant power supply.

As a matter of fact, computer systems 1 having multiple retrofit expansion boards 12 are conceivable. Alternatively, more than one retrofit power supply unit can be connected with at least one retrofit expansion board.

LIST OF REFERENCE CHARACTERS

1 Computer system
2 Chassis
3 System board
4 Component
5 Port
6 First plug connector
7 First power supply unit
8 Circuit
9 First power plug connector
10 First signal plug connector
11 First plugin option
12 Expansion board
13 Second power plug connector
14 Second signal plug connector
15 Passive component
16 Third plug connector
17 Second power supply unit
18 Second plugin option
19 power supply cable
20 Signal cable
A First region
B Second region
C Third region
D Fourth region

The invention claimed is:

1. Computer system having a redundant power supply, comprising
   a chassis,
   a system board, which is arranged in die chassis,
   a first power supply unit, which is directly connected to the system board via at least one first plug connector,
   an expansion board, which is arranged in the chassis and connected to the system board via at least one second plug connector,
   a second power supply unit, which is directly connected to the expansion board via at least one third plug connector, and
   a circuit, which is arranged on the system board, wherein the circuit is connected to the at least one first plug connector and the at least one second plug connector and is configured to enable a power supply of the computer system selectively by the first power supply unit and/or the second power supply unit.

2. Computer system according to claim 1, wherein the system board is arranged in a first region and the chassis comprises a first plugin option for the first power supply unit in a second region adjacent the first region, and wherein the expansion board is arranged in a third region and the chassis comprises a second plugin option for the second power supply unit in a fourth region adjacent the third region.

3. Computer system according to claim 1, wherein the expansion board exclusively comprises passive components, in particular plug connectors, signal lines and power lines.

4. Computer system according to claim 1, wherein the first power supply unit and the second power supply unit support hotplug.

5. Computer system according to claim 1, wherein the at least one second plug connector comprises a first power plug connector and a first signal plug connector on the system board and a second power plug connector and a second signal plug connector on the expansion board.

6. Computer system according to claim 5, wherein the first power plug connector and the second power plug connector are connected via a power supply cable and the first signal plug connector and the second signal plug connector are connected via a signal cable.

7. Computer system according to claim 1, wherein the at least one expansion board is plugged directly to the system board via the at least one second plug connector.

8. Computer system according to claim 1, wherein at least two power supply units are connected to the expansion board.

9. Computer system according to claim 1, wherein the computer system comprises at least one further expansion board, which is connected to at least one further power supply unit.

10. System board, having at least one first plug connector for direct connection of a first power supply unit, and at least one second plug connector for indirect connection of a second power supply unit via a retrofittable expansion board, and a circuit, which is connected to the at least one first plug connector and the at least one second plug connector and which is configured to enable a power supply of the computer system selectively by the first power supply unit and/or the second power supply unit.

11. System board according to claim 10, wherein the at least one second plug connector comprises a first power plug connector and a first signal plug connector on the system board.

12. Computer system, comprising:
    a chassis,
    a system board, which is arranged in die chassis,
    a first power supply unit, which is directly connected to the system board via at least one first plug connector,
    at least one second plug connector, which is arranged on the system board, for indirect connection of a second power supply unit via a retrofittable expansion board, and
    a circuit, which is arranged on the system board, wherein the circuit is connected to the at least one first plug connector and the at least one second plug connector and which is configured to enable a power supply of the computer system selectively by the first power supply unit and/or the second power supply unit.

13. Computer system according to claim 12, wherein the system board is arranged in a first region and the chassis comprises a first plugin option for the first power supply unit in a second region adjacent the first region, and wherein the chassis comprises a third region for retrofitting an expansion board and the chassis further comprises a second plugin option for the second power supply unit in a fourth region adjacent the third region.

\* \* \* \* \*